(12) United States Patent
Naruoka et al.

(10) Patent No.: US 10,247,090 B2
(45) Date of Patent: Apr. 2, 2019

(54) SUPERCHARGER FOR ENGINE (71) Applicant: KAWASAKI JUKOGYO KABUSHIKI KAISHA, Kobe-shi, Hyogo (JP)

(72) Inventors: Shohei Naruoka, Kakogawa (JP); Yoshiharu Matsuda, Akashi (JP)

(73) Assignee: KAWASAKI JUKOGYO KABUSHIKI KAISHA (JP)

(*) Notice: Subject to any disclaimer, the term of this patent is extended or adjusted under 35 U.S.C. 154(b) by 425 days.

(21) Appl. No.: 15/085,846

(22) Filed: Mar. 30, 2016

(65) Prior Publication Data
US 2016/0208683 A1 Jul. 21, 2016

Related U.S. Application Data (63) Continuation of application No. PCT/JP2013/081039, filed on Nov. 18, 2013.

(51) Int. Cl.
F02B 33/44 (2006.01)
F16H 7/08 (2006.01)
(Continued)

(52) U.S. Cl.
CPC ............ F02B 39/04 (2013.01); F01M 1/02 (2013.01); F01M 11/02 (2013.01); F02B 39/14 (2013.01);
(Continued)

(58) Field of Classification Search
CPC .......... F02B 39/04; F02B 39/14; F02B 61/02; F01M 1/02; F01M 11/02;
(Continued)

(56) References Cited

U.S. PATENT DOCUMENTS 2,223,715 A * 12/1940 Berger .................... F16D 33/16
                                                              123/561
2,400,306 A *  5/1946 Hobbs ...................... F02D 9/00
                                                              123/561
(Continued)

FOREIGN PATENT DOCUMENTS

CN    101103179 A     1/2008
DE       3711603     10/1988
(Continued)

OTHER PUBLICATIONS

English Translation of the International Preliminary Report on Patentability and Written Opinion of the International Searching Authority dated Jun. 2, 2016 for International PCT Patent Application No. PCT/JP2013/081039, filed Nov. 18, 2013 (9 pages).
(Continued)

Primary Examiner — Thai Ba Trieu (57) ABSTRACT

A supercharger is driven by a rotational force of a crankshaft of a combustion engine via a chain. The supercharger includes: a supercharger rotation shaft to which an impeller is fixed; a supercharger holder that rotatably supports the supercharger rotation shaft; and a hydraulic tensioner that is mounted on the supercharger holder and suppresses slack of the chain. In the supercharger holder, a supercharger lubricating oil passage that introduces a lubricating oil to the supercharger is formed. A part of the lubricating oil introduced to the supercharger lubricating oil passage is supplied to a hydraulic cylinder of the hydraulic tensioner through a branch path.

9 Claims, 7 Drawing Sheets (51) Int. Cl.
*F02B 39/04* (2006.01)
*F02B 39/14* (2006.01)
*F01M 1/02* (2006.01)
*F02B 61/02* (2006.01)
*F01M 11/02* (2006.01)
*F16H 57/04* (2010.01)

(52) U.S. Cl.
CPC ......... *F02B 61/02* (2013.01); *F16H 57/0421* (2013.01); *F16H 57/0471* (2013.01); *F16H 57/0475* (2013.01); *F01M 2011/021* (2013.01); *F16H 7/08* (2013.01); *F16H 2007/0812* (2013.01); *F16H 2007/0893* (2013.01)

(58) Field of Classification Search
CPC ........... F01M 2011/021; F16H 57/0421; F16H 57/0471; F16H 57/0475; F16H 57/0423; F16H 57/0432; F16H 2007/0812; F16H 2007/0893; F16H 2007/0842; F16H 2007/0861; F16H 7/02; F16H 7/08; F16H 7/0838; F16H 7/0848
USPC .............. 60/605.3, 607–609; 184/6.11, 6.12; 474/18, 90, 110–111; 123/561
See application file for complete search history.

(56) References Cited

U.S. PATENT DOCUMENTS

| | | | | |
|---|---|---|---|---|
| 2,583,537 | A * | 1/1952 | Alexanderson | F02D 9/00 74/718 |
| 2,667,150 | A * | 1/1954 | Coar | F02D 9/00 92/49 |
| 2,678,639 | A * | 5/1954 | Alexanderson | F02D 9/00 92/43 |
| 2,922,314 | A * | 1/1960 | Johnson | F02B 39/12 74/337 |
| 4,622,817 | A * | 11/1986 | Kobayashi | F02B 39/08 60/608 |
| 4,969,332 | A * | 11/1990 | Nancarrow | F02B 39/14 60/608 |
| 5,176,581 | A * | 1/1993 | Kumm | F16H 9/14 474/110 |
| 5,361,744 | A * | 11/1994 | Teraoka | F02B 39/04 474/18 |
| 5,366,418 | A * | 11/1994 | Fukushima | F16H 7/08 474/111 |
| 5,394,853 | A * | 3/1995 | Teraoka | F02B 39/04 474/18 |
| 5,462,035 | A * | 10/1995 | Teraoka | F02B 39/04 474/18 |
| 5,937,833 | A * | 8/1999 | Kapich | F02B 37/04 60/609 |
| 6,146,300 | A * | 11/2000 | Suzuki | F16H 7/08 474/109 |
| 6,390,869 | B2 | 5/2002 | Korenjak et al. | |
| 6,415,759 | B2 | 7/2002 | Ohrnberger et al. | |
| 6,478,701 | B1 * | 11/2002 | Yasuhara | F16H 7/12 474/110 |
| 6,502,398 | B2 * | 1/2003 | Kapich | F02B 39/14 60/607 |
| 6,544,086 | B2 | 4/2003 | Tscherne et al. | |
| 6,568,376 | B2 | 5/2003 | Sonnleitner et al. | |
| 6,591,819 | B2 | 7/2003 | Tscherne et al. | |
| 6,601,528 | B2 | 8/2003 | Bilek et al. | |
| 6,626,140 | B2 | 9/2003 | Aichinger et al. | |
| 7,000,577 | B2 | 2/2006 | Bilek et al. | |
| 7,040,874 | B1 | 5/2006 | Martin et al. | |
| 7,101,238 | B2 | 9/2006 | Aichinger et al. | |
| 7,337,755 | B2 | 3/2008 | Gokan et al. | |
| 7,530,228 | B2 | 5/2009 | Martin et al. | |
| 7,549,493 | B1 | 6/2009 | Jones | |
| 7,552,721 | B2 | 6/2009 | Wolfsgruber et al. | |
| 7,600,492 | B2 | 10/2009 | Bilek et al. | |
| 7,882,819 | B2 | 2/2011 | Koyama | |
| 8,707,931 | B2 | 4/2014 | Arima et al. | |
| 10,029,695 | B1 * | 7/2018 | Gibson | B60W 30/192 |
| 2001/0039908 | A1 | 11/2001 | Bilek et al. | |
| 2001/0039934 | A1 | 11/2001 | Ohrnberger et al. | |
| 2001/0042532 | A1 | 11/2001 | Aichinger et al. | |
| 2001/0044244 | A1 | 11/2001 | Tscherne et al. | |
| 2001/0044352 | A1 | 11/2001 | Korenjak et al. | |
| 2001/0052340 | A1 | 12/2001 | Sonnleitner et al. | |
| 2001/0053640 | A1 | 12/2001 | Korenjak et al. | |
| 2002/0000224 | A1 | 1/2002 | Tscherne et al. | |
| 2002/0011222 | A1 | 1/2002 | Bilek et al. | |
| 2004/0069250 | A1 | 4/2004 | Aichinger et al. | |
| 2004/0168441 | A1 | 9/2004 | Dumas et al. | |
| 2006/0065218 | A1 | 3/2006 | Gokan et al. | |
| 2006/0104832 | A1 | 5/2006 | Martin et al. | |
| 2006/0193734 | A1 | 8/2006 | Martin et al. | |
| 2007/0068465 | A1 | 3/2007 | Wolfsgruber et al. | |
| 2007/0105465 | A1 | 5/2007 | Wolfsgruber et al. | |
| 2008/0127915 | A1 | 6/2008 | Bilek et al. | |
| 2008/0173275 | A1 | 7/2008 | Koyama | |
| 2011/0168126 | A1 * | 7/2011 | Fujikawa | F02B 39/14 123/196 R |
| 2012/0192839 | A1 | 8/2012 | Arima et al. | |
| 2013/0288836 | A1 * | 10/2013 | Kurematsu | F16H 7/0836 474/110 |
| 2014/0309882 | A1 * | 10/2014 | Antchak | F16H 7/12 474/104 |
| 2015/0024887 | A1 * | 1/2015 | Oh | F16H 7/08 474/110 |
| 2015/0240918 | A1 * | 8/2015 | Emizu | F16H 7/08 474/110 |
| 2015/0354675 | A1 * | 12/2015 | Hao | F16H 7/1281 474/90 |
| 2016/0033016 | A1 * | 2/2016 | Todd | F16H 7/0836 474/111 |
| 2016/0102736 | A1 * | 4/2016 | Suchecki | F16H 7/08 474/110 |
| 2016/0153529 | A1 * | 6/2016 | Kobayashi | F16H 7/08 474/111 |
| 2017/0059010 | A1 * | 3/2017 | Staley | F16H 7/0838 |
| 2017/0138444 | A1 * | 5/2017 | Kurematsu | F16H 7/0848 |
| 2017/0204945 | A1 * | 7/2017 | Emig | F16H 7/02 |

FOREIGN PATENT DOCUMENTS

| | | | | |
|---|---|---|---|---|
| JP | 61-138839 | | 8/1986 | |
| JP | 02-061134 | | 5/1990 | |
| JP | 02-291424 | | 12/1990 | |
| JP | 03-010041 | | 1/1991 | |
| JP | 03-047425 | | 2/1991 | |
| JP | 09-222008 | | 8/1997 | |
| JP | 2006-097614 | | 4/2006 | |
| JP | 2008-175138 | | 7/2008 | |
| JP | 2008-267454 | | 11/2008 | |
| JP | 2010-127073 | | 6/2010 | |
| JP | 2011-144813 | | 7/2011 | |
| JP | 2011140909 | A * | 7/2011 | ............. F02B 39/14 |
| JP | 2011140928 | A * | 7/2011 | ............. F02B 39/14 |
| JP | 2012-002139 | | 1/2012 | |
| WO | WO01/65093 | | 9/2001 | |
| WO | WO2006/055560 | | 5/2006 | |
| WO | WO2011/046098 | | 4/2011 | |

OTHER PUBLICATIONS

Notification of Reason(s) for Rejection dated Feb. 28, 2017 and English Language Summary thereof for corresponding Japan Patent Application No. 2015-547370 (10 pages).

Decision of Grant dated Aug. 22, 2017 for Corresponding Japanese Patent Application No. 2015-547370 (3 pages).

Extended and Supplementary Search Report dated Jun. 6, 2017 for Corresponding European Patent Application No. 13897686.5 (8 pages).

(56) References Cited

OTHER PUBLICATIONS

First Office Action dated Nov. 29, 2017 for Corresponding Chinese Patent Application No. 201380080981.9 with English Language Translation of the Search Report attached to the Office Action (8 pages).
International Search Report for PCT/JP2013/081039, dated Dec. 17, 2013, 4 pages.

* cited by examiner

SUPERCHARGER FOR ENGINE

CROSS REFERENCE TO THE RELATED APPLICATION

This application is a continuation application, under 35 U.S.C § 111(a) of international application No. PCT/JP2013/081039, filed Nov. 18, 2013.

BACKGROUND OF THE INVENTION

Field of the Invention

The present invention relates to a supercharger which is driven by a rotational force of a crankshaft of a combustion engine via an endless band-shaped power transmission member.

Description of Related Art

A combustion engine provided with a supercharger has been known in which the supercharger is driven by a rotational force of a crankshaft via an endless band-shaped power transmission member such as a chain (e.g., Patent Document 1).

RELATED DOCUMENT

Patent Document

[Patent Document 1] WO 2011/046098

However, when a great rotational force is transmitted from the crankshaft of the combustion engine, rotation fluctuation that occurs in the chain is considerable. Specifically, rotation fluctuation may be caused by explosion, suction, or the like of the combustion engine or by change in the rotation speed of the combustion engine due to an accelerating/decelerating operation. Such rotation fluctuation may reduce the durability of the chain.

SUMMARY OF THE INVENTION

In view of the above problem, an object of the present invention is to provide a supercharger for a combustion engine, which has a simple structure and is able to increase the durability of a power transmission member even when rotation fluctuation occurs in the power transmission member.

In order to achieve the above object, a supercharger for a combustion engine according to the present invention is driven by a rotational force of a crankshaft of the combustion engine via an endless band-shaped power transmission member. The supercharger includes: a supercharger lubricating oil passage that introduces a lubricating oil to the supercharger; a hydraulic biasing force generating device that suppresses slack of the power transmission member; and a branch path branched off the supercharger lubricating oil passage. A part of the lubricating oil introduced to the supercharger lubricating oil passage is supplied as a hydraulic source to the biasing force generating device through the branch path.

According to the above configuration, a large pressing force generated by hydraulic pressure can be applied to the power transmission member. Therefore, even if rotation fluctuation is transmitted from the crankshaft, slack of the power transmission member can be suppressed. As a result, durability of the power transmission member is increased. Further, since a part of the lubricating oil introduced into the supercharger to lubricate a rotating portion of the supercharger is utilized for the biasing force generating device, a pressing force due to hydraulic pressure can be obtained by a simple structure.

In the present invention, preferably, the supercharger further includes a biasing force generating device mounting portion on which the biasing force generating device is mounted, and the branch path is formed in the biasing force generating device mounting portion. According to this configuration, since the branch path for the biasing force generating device is formed in the biasing force generating device mounting portion, piping from the hydraulic source need not be additionally provided. Further, since the lubricating oil is supplied to the biasing force generating device by only mounting the biasing force generating device on the mounting portion, workability is improved.

In the present invention, preferably, the supercharger further includes a supercharger holder that supports a supercharger rotation shaft and detachably mounted on a combustion engine case, and the biasing force generating device is detachably mounted on the supercharger holder. According to this configuration, the supercharger can be independently handled as a supercharger unit including the biasing force generating device. Thus, switching between a supercharger-equipped combustion engine and a combustion engine having no supercharger can be easily performed.

When the supercharger includes the supercharger holder, preferably, the combustion engine includes a lubricating oil pump accommodated in the combustion engine case, and the supercharger lubricating oil passage is formed passing through abutting surfaces of the supercharger holder and the combustion engine case. In this case, preferably, the lubricating oil pump introduces the lubricating oil to a portion-to-be-lubricated or a portion-to-be-cooled of the combustion engine. According to this configuration, the lubricating oil is supplied to the biasing force generating device by only mounting the supercharger holder on the combustion engine case. Thus, the workability is further improved.

When the combustion engine includes the lubricating oil pump, preferably, driving power is transmitted to the lubricating oil pump directly or indirectly from the crankshaft. According to this configuration, since the discharge pressure of the lubricating oil pump varies in accordance with the rotation speed of the combustion engine, fluctuation of the power transmission member, which is increased with an increase in the rotation speed of the combustion engine, can be effectively suppressed by the biasing force generating device.

When the supercharger includes the supercharger holder, preferably, the biasing force generating device includes a pressing member that pivots around a pivot shaft to apply a pressing force to the power transmission member, and the pivot shaft is supported by the combustion engine case. According to this configuration, since the pivot shaft is supported by the combustion engine case, the strength of the supercharger holder may be reduced.

In the present invention, a part of the lubricating oil to be supplied to the supercharger is branched to be supplied to a hydraulic cylinder of the supercharger. According to this configuration, since the branch path is branched at the upstream side of the portion-to-be-lubricated in the supercharger lubricating oil passage, reduction in the lubricating oil pressure in the supercharger lubricating oil passage can be suppressed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, a preferred embodiment of the present invention will be described with reference to the drawings. The terms "left side" and "right side" in this specification are the left side and the right side as viewed from a driver on a vehicle.

Figure 1:
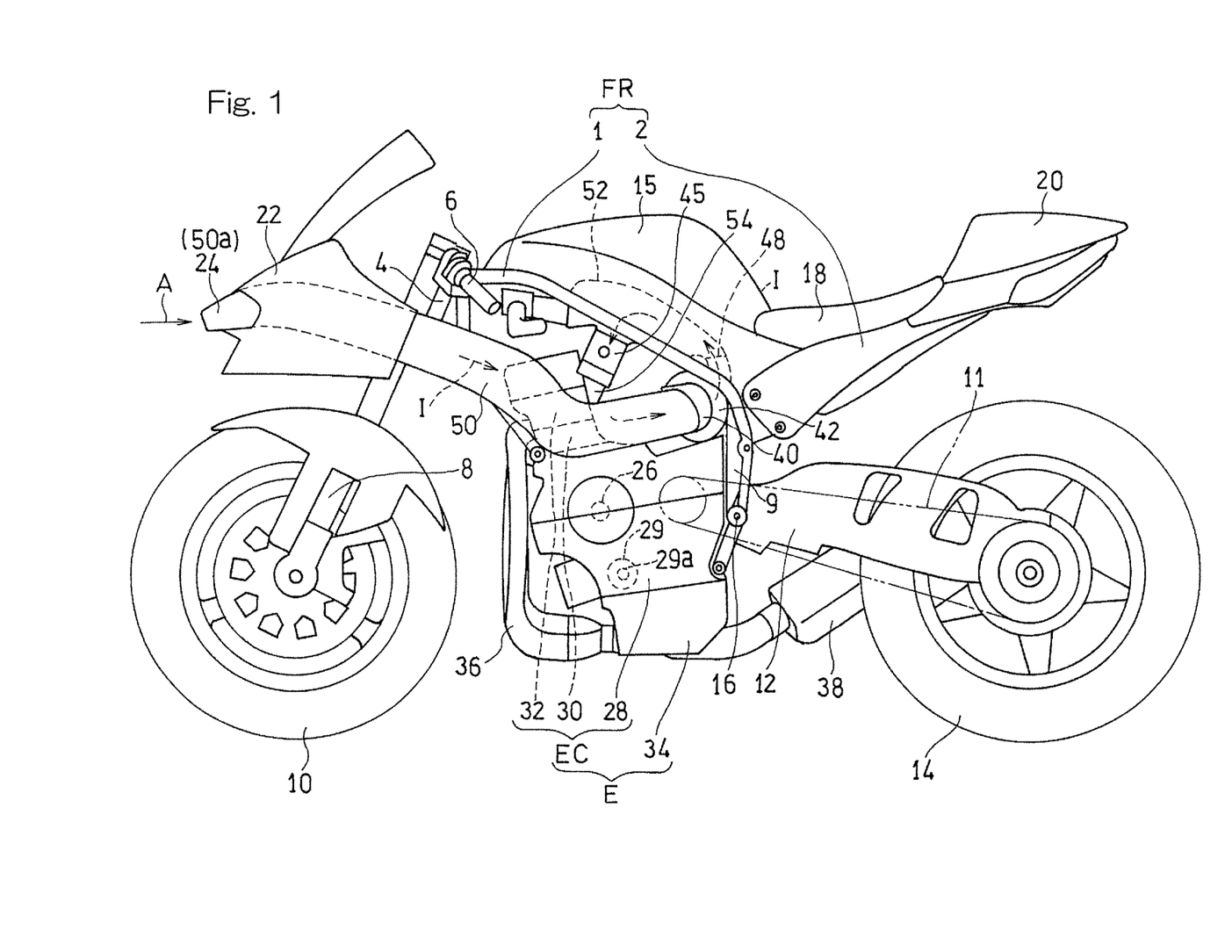
FIG. 1 is a side view showing a motorcycle equipped with a supercharger for a combustion engine, according to a first embodiment of the present invention.

FIG. 1 is a left side view of a motorcycle equipped with a supercharger for a combustion engine, according to a first embodiment of the present invention. A motorcycle frame structure FR of the motorcycle includes a main frame 1 which forms a front half of the motorcycle frame structure FR, and a rear frame 2 which forms a rear half of the motorcycle frame structure FR. A head pipe 4 is provided on a front end of the main frame 1, and a front fork 8 is pivotally supported by the head pipe 4 through a steering shaft (not shown). A front wheel 10 is mounted to a lower end portion of the front fork 8. A steering handle 6 is fixed to an upper end portion of the front fork 8.

Meanwhile, a swingarm bracket 9 is provided at a rear end portion of the main frame 1 which is a lower intermediate portion of the motorcycle frame structure FR. A swingarm 12 is supported for swing movement in a vertical direction about a pivot shaft 16 which is mounted to the swingarm bracket 9. A rear wheel 14 is rotatably supported by a rear end portion of the swingarm 12. A combustion engine E is mounted to the lower intermediate portion of the motorcycle frame structure FR at the front side of the swingarm bracket 9. This combustion engine E drives the rear wheel 14 through a drive chain 11.

The combustion engine E includes: a crankshaft 26 having a rotary shaft extending in a left-right direction (vehicle widthwise direction); a crankcase 28 supporting the crankshaft 26; a cylinder block 30 projecting upward from an upper surface of a front portion of the crankcase 28; a cylinder head 32 above the cylinder block 30; and an oil pan 34 provided below the crankcase 28. In the present embodiment, the crankcase 28 and the cylinder block 30 are integrally formed by molding. The crankcase 28, the cylinder block 30, and the cylinder head 32 cooperate together to form an engine case EC.

A lubricating oil pump 29 is provided within the crankcase 28 of the combustion engine E. A rotational force of the crankshaft 26 is gear-transmitted to a rotary shaft 29a of the lubricating oil pump 29, and the lubricating oil pump 29 is driven by the combustion engine E. The lubricating oil pump 29 supplies a lubricating oil to a portion-to-be-lubricated or a portion-to-be-cooled of the combustion engine E through an engine lubricating oil passage (not shown) formed in the engine case EC. The lubricating oil pump 29 also supplies the lubricating oil to a later-described supercharger 42.

Four exhaust pipes 36 are connected to a front surface of the cylinder head 32. The four exhaust pipes 36 are merged together at a location beneath the combustion engine E, and are connected to an exhaust muffler 38 disposed at the right side of the rear wheel 14.

A fuel tank 15 is disposed on an upper portion of the main frame 1, and a rider's seat 18 and a passenger's seat 20 are supported by the rear frame 2. In addition, a fairing 22 made of a resinous material is mounted on a front portion of the motorcycle. The fairing 22 covers the front of the head pipe 4. An air inlet 24 is formed in the fairing 22. The air inlet 24 is located at a front end of the fairing 22, and takes in intake air from the outside to the combustion engine E.

An air intake duct 50 is disposed at the left side of the motorcycle frame structure FR. The air intake duct 50 is supported by the head pipe 4 such that a front end opening 50a thereof faces the air inlet 24 of the fairing 22. The pressure of air introduced through the front end opening 50a of the air intake duct 50 is increased by a ram effect.

The supercharger 42 and an air cleaner 40 that cleans outside air are disposed rearward of the cylinder block 30 and on an upper surface of the crankcase 28 so as to be aligned in the vehicle widthwise direction. The air intake duct 50 introduces incoming wind A as intake air I from the front of the combustion engine E through left outer lateral sides of the cylinder block 30 and the cylinder head 32 into the air cleaner 40. The supercharger 42 pressurizes air, cleaned by the air cleaner 40, and supplies it to the combustion engine E.

An air intake chamber 52 is disposed between a discharge port 48 of the supercharger 42 and an air intake port 54 of the combustion engine E, and the discharge port 48 of the supercharger 42 and the air intake chamber 52 are directly connected to each other. The air intake chamber 52 stores the high-pressure intake air I supplied from the discharge port 48 of the supercharger 42. A throttle body 45 is disposed between the air intake chamber 52 and the air intake port 54. The air intake chamber 52 is disposed above the supercharger 42 and the throttle body 45. The fuel tank 15 is disposed above the air intake chamber 52 and the throttle body 45.

Figure 2:
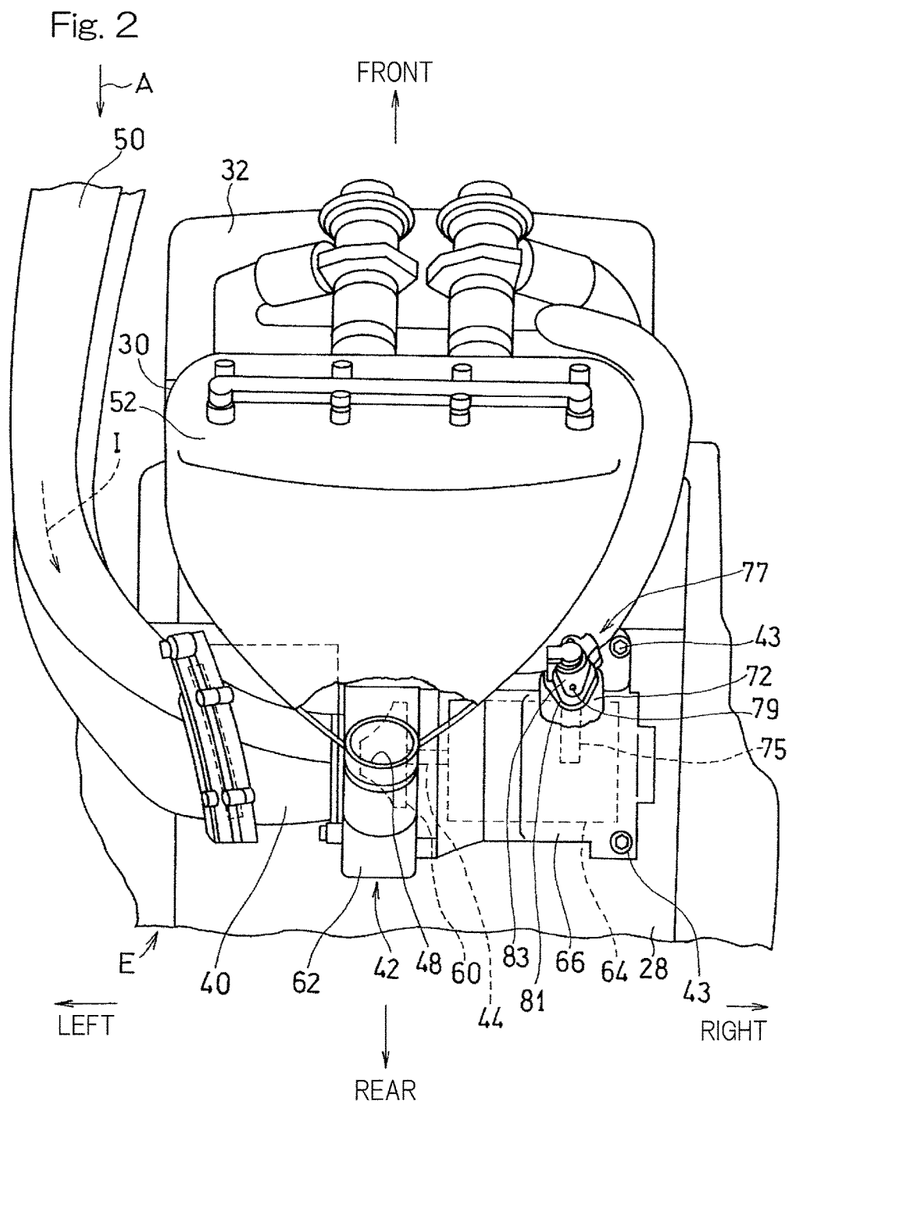
FIG. 2 is a perspective view of the combustion engine as seen obliquely from the rear and above.

As shown in FIG. 2, the supercharger 42 is disposed adjacently to and at the right side of the air cleaner 40, and is fixed to the upper surface of the crankcase 28 by means of bolts 43. The supercharger 42 has a suction port located above the crankcase 28 and slightly leftward of a center portion of the combustion engine E in the widthwise direction. The discharge port 48 of the supercharger 42 is located in the center portion of the combustion engine E in the widthwise direction of the motorcycle.

The supercharger 42 includes: a centrifugal type impeller 60 that pressurizes intake air; an impeller casing 62 that covers the impeller 60; a transmission mechanism 64 that transmits power of the combustion engine E to the impeller 60; and a supercharger holder 66 that rotatably supports the supercharger rotation shaft 44. The supercharger holder 66 also covers the transmission mechanism 64. The supercharger holder 66 and the air cleaner 40 are disposed at the right side and the left side, respectively, in the widthwise direction of the motorcycle with the impeller casing 62 located therebetween. The transmission mechanism 64 may be dispensed with.

Figure 3:
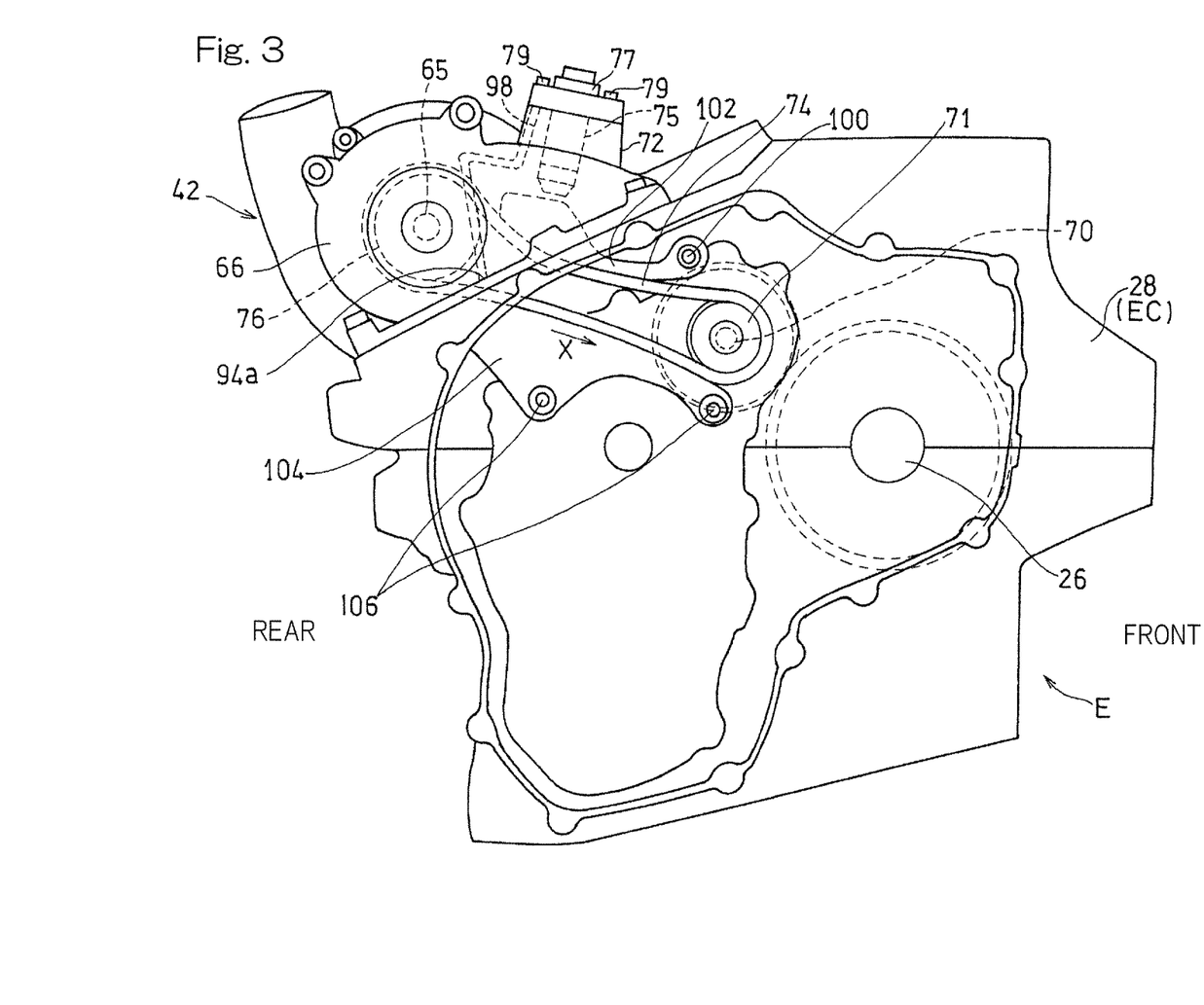
FIG. 3 is a side view of the combustion engine.

The supercharger 42 is driven by power of the combustion engine E. Specifically, as shown in FIG. 3 which is a right side view of the combustion engine, the rotational force of the crankshaft 26 is transmitted to an input shaft 65 connected to the supercharger rotation shaft 44 (FIG. 2) through a chain 74 which is one kind of an endless band-shaped power transmission member. More specifically, an output-side sprocket 71 is provided at a right end portion of a supercharger drive shaft 70 gear-connected to the crankshaft 26. An input-side sprocket 76 is provided at a right end portion of the input shaft 65. The chain 74 is trained between the sprockets 71 and 76.

The supercharger holder 66 is provided with a hydraulic tensioner 75 which is one kind of a hydraulic biasing force generating device that suppresses slack or play of the chain 74. Specifically, as shown in FIG. 2, a projecting tensioner mounting portion 72 is integrally formed at a front upper portion of the supercharger holder 66. A hydraulic cylinder 77, which is a member to drive the hydraulic tensioner 75, is detachably mounted on the tensioner mounting portion 72 by means of fastening members 79 such as bolts, while a cover 83 covers a flange 81 of the hydraulic cylinder 77. The hydraulic tensioner 75 will be described later in detail.

Figure 4:
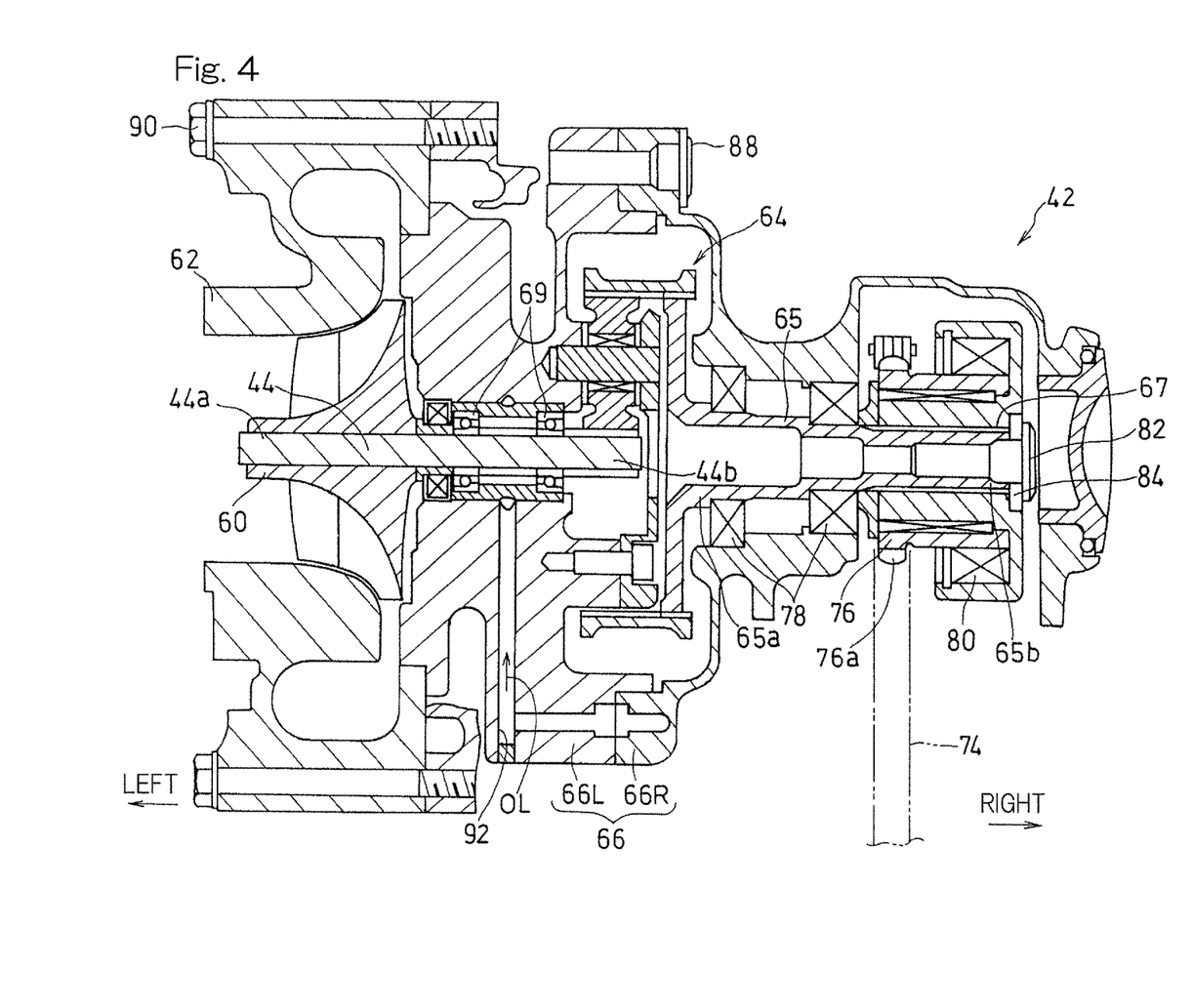
FIG. 4 is a horizontal cross-sectional view of the supercharger.

As shown in FIG. 4, the input shaft 65 is a hollow shaft and is rotatably supported by the supercharger holder 66 through bearings 78. Spline teeth 67 are formed on the outer peripheral surface of a right end portion 65*b* of the input shaft 65, and a one-way clutch 80 is spline-fitted to this outer peripheral surface. The input-side sprocket 76 is connected to the input shaft 65 through the one-way clutch 80.

An internal thread portion is formed on the inner peripheral surface of the right end portion 65*b* of the input shaft 65, and the one-way clutch 80 is mounted on the right end portion 65*b* through a washer 84 by a head portion of a bolt 82 screwed into the internal thread portion. The input shaft 65 forms an input-side rotary shaft of the transmission mechanism 64.

The impeller 60 is fixed to a left end portion 44*a* of the supercharger rotation shaft 44 of the supercharger 42, and a right side portion 44*b* of the supercharger rotation shaft 44 is connected to a left end portion 65*a* of the input shaft 65 through the transmission mechanism 64. That is, the transmission mechanism 64 is disposed between the input shaft 65 and the supercharger rotation shaft 44 and is supported by the supercharger holder 66. In the present embodiment, a planetary gear device is used as the transmission mechanism 64, and the planetary gear device increases the speed of rotation of the input shaft 65 and transmits the rotation to the supercharger rotation shaft 44.

The supercharger rotation shaft 44 is rotatably supported by the supercharger holder 66 through bearings 69. The supercharger holder 66 includes an input case portion 66R that accommodates the input shaft 65, the input-side sprocket 76 and the one-way clutch 80, and a gear case portion 66L that accommodates the transmission mechanism 64. The input case portion 66R and the gear case portion 66L are connected to each other by means of bolts 88. Further, the impeller casing 62 is connected to the gear case portion 66L of the supercharger holder 66 by means of bolts 90.

Figure 5:
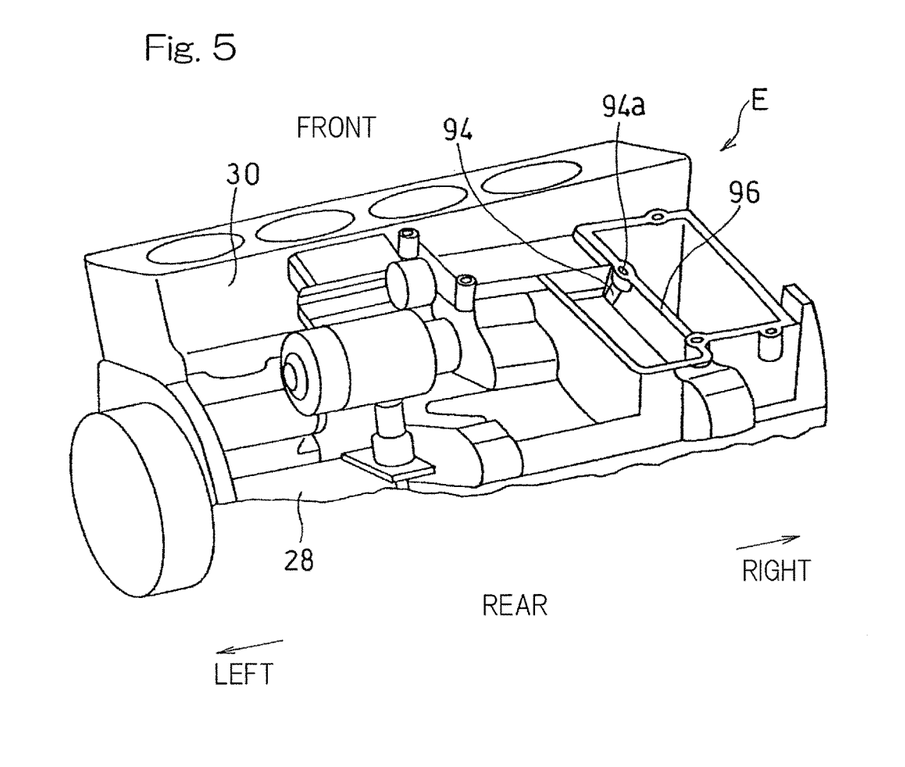
FIG. 5 is a perspective view of a state where the supercharger for the combustion engine is detached, as seen obliquely from the rear and above.

In the supercharger holder 66, a supercharger lubricating oil passage 92 is formed. The supercharger lubricating oil passage 92 introduces a lubricating oil OL, supplied from the lubricating oil pump 29 outside the supercharger 42, and guides the lubricating oil OL to the bearing 69 and the transmission mechanism 64. Specifically, as shown in FIG. 5, an exit port 94*a* of a supercharger lubricating oil introduction path 94 that introduces the lubricating oil from the lubricating oil pump 29 (FIG. 1) into the supercharger 42 is formed in an abutting surface 96 of the crankcase 28 which abuts the supercharger holder 66. The lubricating oil OL discharged from the exit port 94*a* is supplied to the bearing 69, and is also supplied to the transmission mechanism 64 through a passage (not shown).

Specifically, the lubricating oil introduced into the supercharger 42 is supplied to the bearing 69 and also to a shaft-supporting portion and a teeth meshing portion of the transmission mechanism (planetary gear device) 64, the input-side sprocket 76, the chain 74, and the like. In addition, in the case that an oil film damper is interposed between the supercharger rotation shaft 44 and the supercharger holder 66, the lubricating oil may be supplied to the oil film damper through the supercharger lubricating oil passage 92. The lubricating oil is supplied from the lubricating oil pump 29 of the combustion engine E to these respective components.

Figure 6:
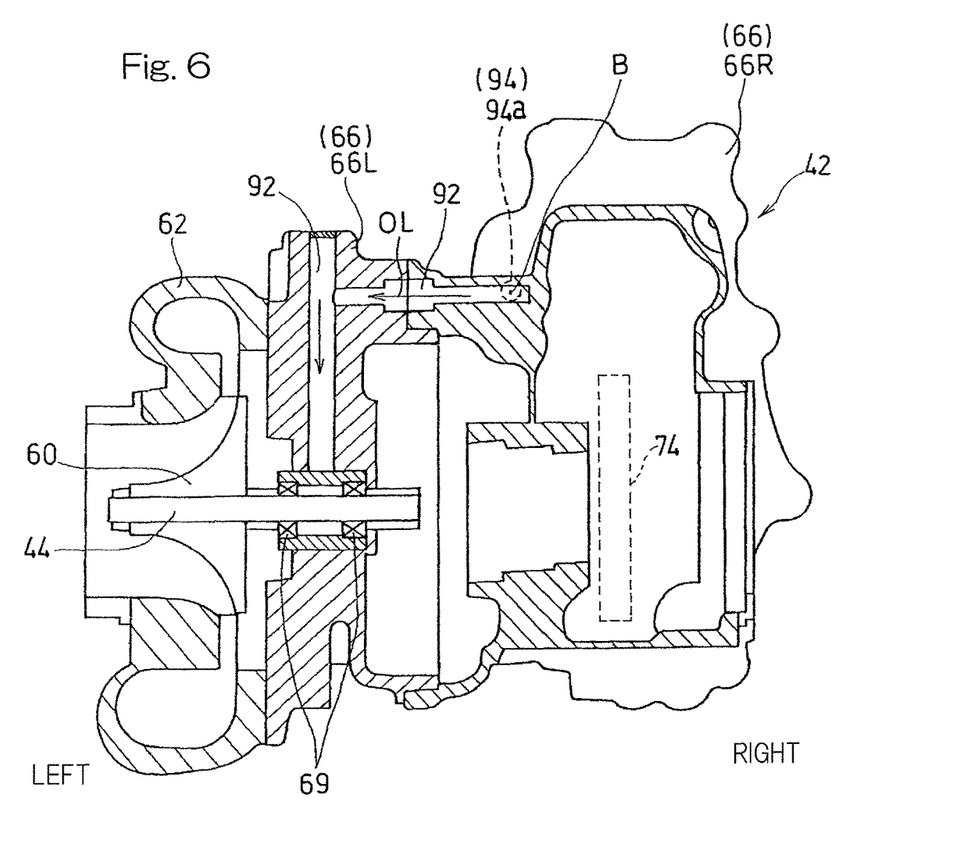
FIG. 6 is a horizontal cross-sectional view of a supercharger holder for the supercharger.

As shown in FIG. 6, the supercharger lubricating oil introduction path 94 is connected, from the exit port 94*a*, directly to the supercharger lubricating oil passage 92 of the supercharger holder 66, and supplies the lubricating oil to the bearings 69. Specifically, the supercharger lubricating oil passage 92 extends leftward from the input case portion 66R, and extends radially of the shaft 44 inward in the gear case portion 66L, thereby supplying the lubricating oil to the bearing 69 of the supercharger rotation shaft 44. Thus, the lubricating oil OL is supplied from the lubricating oil pump 29 (FIG. 1) to the supercharger lubricating oil passage 92 by mounting the supercharger holder 66 on the engine case EC.

In the input case portion 66R, a tensioner lubricating oil passage 98 (FIG. 7) branching from the supercharger lubricating oil passage 92 is formed. The tensioner lubricating oil passage 98 branches from the supercharger lubricating oil passage 92. Specifically, the lubricating oil that flows upward from the exit port 94*a* is branched at a branch point B to the supercharger lubricating oil passage 92 extending leftward and to the tensioner lubricating oil passage 98 extending upward. As shown in FIG. 3, the tensioner lubricating oil passage 98 extends in the tensioner mounting portion 72 of the supercharger holder 66, and is connected to the hydraulic cylinder 77 of the hydraulic tensioner 75. That is, the tensioner lubricating oil passage 98 is branched at the upstream side of the bearing 69 (portion-to-be-lubricated) and the transmission mechanism 64 (portion-to-be-lubricated) in the supercharger lubricating oil passage 92.

As shown in FIG. 6, the lubricating oil OL is introduced into the input case portion 66R of the supercharger 42 through the exit port 94*a* of the supercharger lubricating oil introduction path 94 so as to be supplied to the bearing 69 and the hydraulic cylinder 77. Thus, the tensioner lubricating oil passage 98 can be shortened by providing the introduction portion in the input case portion 66R adjacent to the chain 74 and the hydraulic tensioner 75. In particular, both of the supercharger lubricating oil passage 92 and the tensioner lubricating oil passage 98 can be shortened by providing the introduction portion between the bearing 69 and the chain 74. In addition, the passages 92 and 98 are not external pipes, and therefore, even when leakage of the lubricating oil occurs, the lubricating oil is not likely to leak to the outside of the combustion engine.

Figure 7:
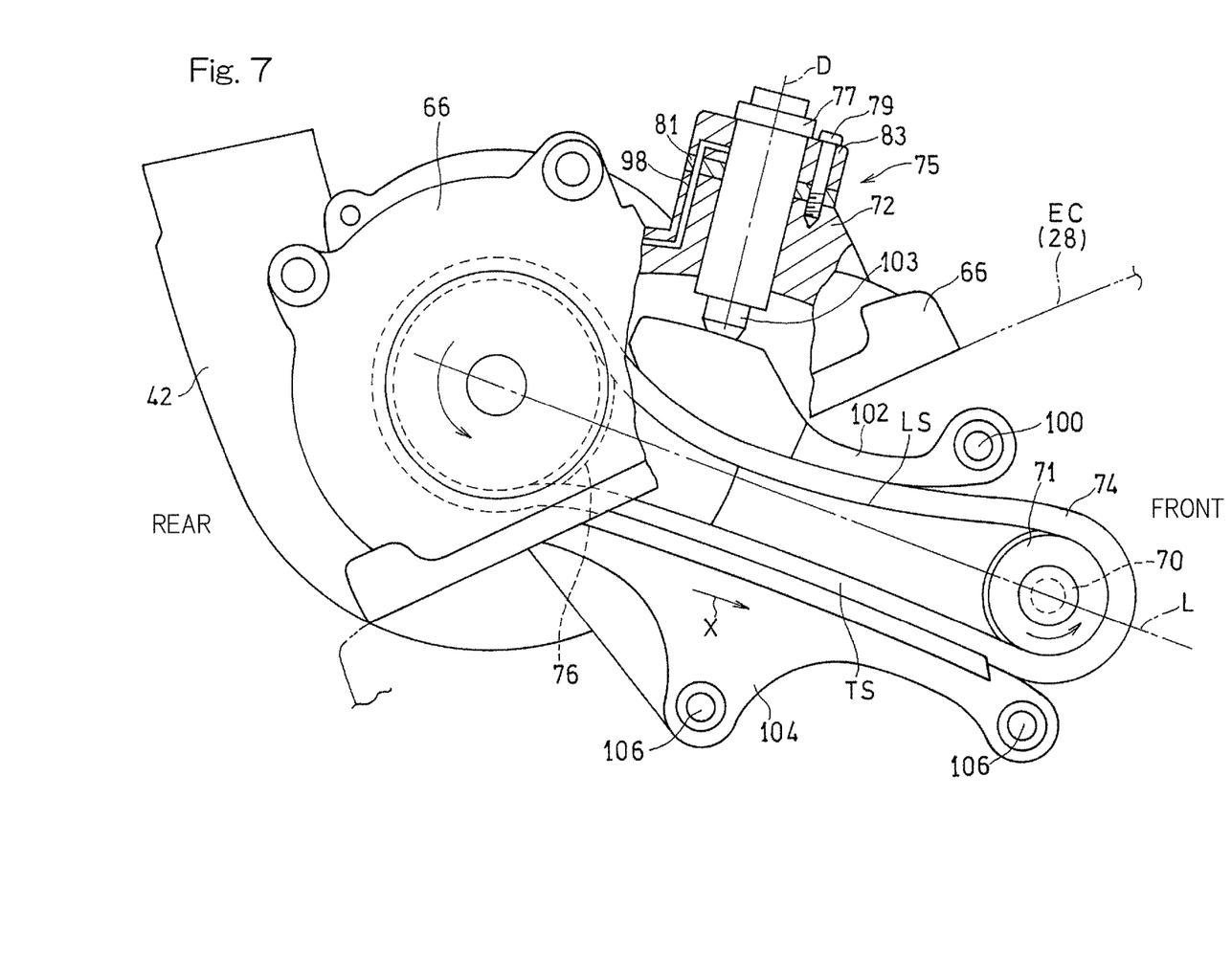
FIG. 7 is a side view of the supercharger.

As shown in FIG. 7, the hydraulic tensioner 75 includes: a pressing member 102 that pivots around a tensioner pivot shaft 100 and applies a pressing force to the chain 74; and a tensioner rod 103 that applies such a pressing force to the pressing member 102. The tensioner pivot shaft 100 is supported by the engine case EC.

The tensioner rod 103 advances and retracts in a tensioner axial direction D due to power from the hydraulic cylinder 77, thereby to control the pressing force applied to the pressing member 102. In accordance with the pressing force applied by the tensioner rod 103, the pressing member 102 pivots around the tensioner pivot shaft 100 to apply the pressing force to the chain 74, thereby adjusting the slack of the chain 74. The pressing force from the hydraulic cylinder 77 is determined by a command from an engine control unit (not shown) on the basis of the speed, the acceleration, and the like, for example.

The chain 74 runs in the direction of an arrow X, and a guide member 104 that guides the chain 74 is provided on a tension side TS opposite to a loose side LS on which the hydraulic tensioner 75 is disposed. The guide member 104 is supported by the engine case EC by means of bolts 106. The guide member 104 makes the running of the chain 74 stable.

The rotation direction of the chain 74 is set so that the loose side LS of the chain 74, i.e., the side at which the chain 74 is drawn from the output-side sprocket 71, is located on the upper side. Thus, the hydraulic tensioner 75 can be disposed above the crankcase 28. As a result, interference with devices and members in the crankcase 28 can be avoided, and therefore, arrangement of the hydraulic tensioner 75 is facilitated as compared to the case where the hydraulic tensioner is disposed beneath the chain 74. Further, since the hydraulic tensioner is disposed above the chain 74, when the lubricating oil used as a driving source drops from the hydraulic tensioner 75, the lubricating oil drops toward the chain 74 to be effectively utilized as a lubricating fluid.

By disposing the input-side sprocket 76 above the rear portion of the crankcase 28, a space is formed between the cylinder block 30 and the supercharger 42, and the hydraulic tensioner 75 can be disposed in this space.

A straight line L connecting the axes of the input-side and output-side sprockets 76 and 71 is tilted upward in the rear direction. Thus, the hydraulic tensioner 75 can be disposed so as to be tilted frontward, and the height of projection of the hydraulic cylinder 77 of the hydraulic tensioner 75 from the supercharger holder 66 can be suppressed. Further, by disposing the input-side sprocket 76 above the rear portion of the crankcase 28, an angle formed between the straight line L and a horizontal surface is reduced. Thus, the tensioner axial direction D (pressing direction) of the hydraulic tensioner 75 becomes closer to the vertical direction, whereby interference between the cylinder block 30 and the hydraulic tensioner 75 can be avoided.

In the above configuration, a greater pressing force can be applied to the chain 74 by the hydraulic tensioner 75. Therefore, even when rotation fluctuation is transmitted from the crankshaft 26, slack and/or rattling of the chain 74 can be suppressed. As a result, durability of the chain 74 is increased. Further, since a part of the lubricating oil OL for lubricating the bearing 69 of the supercharger 42 shown in FIG. 6 is utilized for the hydraulic cylinder 75, a pressing force due to hydraulic pressure can be obtained without additionally providing hydraulic piping.

Since the tensioner lubricating oil passage 98 is formed in the projecting tensioner mounting portion 72 integrally formed with the supercharger holder 66, it is not necessary to additionally provide piping from the hydraulic cylinder 77. Further, since the lubricating oil is supplied to the hydraulic cylinder 77 by only mounting the hydraulic tensioner 75 on the mounting portion 72, the workability is improved.

The supercharger lubricating oil passage 92 is formed in the supercharger holder 66, and the hydraulic tensioner 75 is detachably mounted on the supercharger holder 66. Therefore, the supercharger 42 can be independently handled as a supercharger unit including the hydraulic tensioner 75. Thus, switching between a supercharger-equipped combustion engine and a combustion engine having no supercharger can be easily performed.

By mounting the supercharger holder 66 on the engine case EC, the lubricating oil OL is supplied from the lubricating oil pump 29 of the combustion engine E to the supercharger lubricating oil passage 92, whereby the workability is further improved.

Since the rotary shaft 29a of the lubricating oil pump 29 shown in FIG. 1 is driven by the rotational force of the crankshaft 26, the discharge pressure of the lubricating oil pump 29 varies in accordance with the rotation speed of the combustion engine. Therefore, fluctuation of the chain 74 shown in FIG. 3, which is increased with an increase in the rotation speed of the combustion engine, can be effectively suppressed by the hydraulic tensioner 75.

Since the tensioner pivot shaft 100 shown in FIG. 3 is supported by the engine case EC, the strength of the supercharger holder 66 can be reduced.

As shown in FIG. 6, since the tensioner lubricating oil passage 98 is branched at the upstream side of the bearing 69 in the supercharger lubricating oil passage 92, reduction in the lubricating oil pressure in the supercharger lubricating oil passage 92 can be suppressed.

The present invention suppresses slack of the chain by use of the hydraulic tensioner, and therefore, is advantageously used for a supercharger to which power likely with pulsation is transmitted as a driving force. Specifically, the present invention is advantageously used for a case where power generated in an internal combustion engine is transmitted to a supercharger.

The present invention is not limited to the embodiments described above, and various additions, modifications, or deletions may be made without departing from the gist of the invention. In the embodiment described above, the supercharger of the present invention is applied to a combustion engine for a motorcycle. However, the supercharger of the present invention is also applicable to combustion engines for vehicles other than motorcycles, watercrafts and the like, and furthermore, to combustion engines installed on the ground. Further, as the power transmission member, a knife-shaped belt may be used instead of the chain 74. Therefore, these are construed as included within the scope of the present invention.

REFERENCE NUMERALS

26 . . . crankshaft
29 . . . pump
29a . . . rotary shaft of pump
37 . . . combustion engine lubricating oil passage
42 . . . supercharger 44 . . . supercharger rotation shaft
66 . . . supercharger holder
72 . . . hydraulic tensioner mounting portion (biasing force generating device mounting portion)
74 . . . chain (power transmission member)
75 . . . hydraulic tensioner (biasing force generating device)
77 . . . hydraulic cylinder
92 . . . supercharger lubricating oil passage
98 . . . tensioner lubricating oil passage (branch path)
100 . . . tensioner pivot shaft
102 . . . pressing member
E . . . combustion engine
EC . . . engine case
OL . . . lubricating oil

What is claimed is:

1. A supercharger for a combustion engine, the supercharger being driven by a rotational force of a crankshaft of the combustion engine via an endless band-shaped power transmission member, the supercharger comprising:
   a supercharger lubricating oil passage configured to introduce a lubricating oil to the supercharger;
   a hydraulic biasing force generating device configured to suppress slack of the power transmission member;
   a branch path branched off the supercharger lubricating oil passage; and
   a biasing force generating device mounting portion on which the biasing force generating device is mounted, wherein
   the biasing force generating device includes a pressing member configured to pivot around a pivot shaft to apply a pressing force to the power transmission member,
   a part of the lubricating oil introduced to the supercharger lubricating oil passage is supplied as a hydraulic source to the biasing force generating device through the branch path, and
   the branch path is formed in the biasing force generating device mounting portion.

2. The supercharger for the combustion engine as claimed in claim 1, wherein a part of the lubricating oil to be supplied to a bearing portion of the supercharger is branched to be supplied to the biasing force generating device.

3. The supercharger for the combustion engine as claimed in claim 1, wherein:
   the pivot shaft is supported by the combustion engine case.

4. A supercharger for a combustion engine, the supercharger being driven by a rotational force of a crankshaft of the combustion engine via an endless band-shaped power transmission member, the supercharger comprising:
   a supercharger lubricating oil passage configured to introduce a lubricating oil to the supercharger;
   a hydraulic biasing force generating device configured to suppress slack of the power transmission member;
   a branch path branched off the supercharger lubricating oil passage; and
   a supercharger holder configured to support a supercharger rotation shaft and detachably mounted on a combustion engine case, wherein
   the biasing force generating device includes a pressing member configured to pivot around a pivot shaft to apply a pressing force to the power transmission member,
   a part of the lubricating oil introduced to the supercharger lubricating oil passage is supplied as a hydraulic source to the biasing force generating device through the branch path, and
   the biasing force generating device is detachably mounted on the supercharger holder.

5. The supercharger for the combustion engine as claimed in claim 4, wherein:
   the combustion engine includes a lubricating oil pump accommodated in the combustion engine case;
   the supercharger lubricating oil passage is formed in the supercharger holder and supplied with the lubricating oil from the lubricating oil pump; and
   the supercharger lubricating oil passage opens in abutting surfaces of the supercharger holder and the combustion engine case.

6. The supercharger for the combustion engine as claimed in claim 5, wherein the lubricating oil pump introduces the lubricating oil to a portion-to-be-lubricated or a portion-to-be-cooled of the combustion engine.

7. The supercharger for the combustion engine as claimed in claim 5, wherein driving power is transmitted to the lubricating oil pump directly or indirectly from the crankshaft.

8. The supercharger for the combustion engine as claimed in claim 4, wherein:
   the pivot shaft is supported by the combustion engine case.

9. A supercharger for a combustion engine, the supercharger being driven by a rotational force of a crankshaft of the combustion engine via an endless band-shaped power transmission member, the supercharger comprising:
   a supercharger lubricating oil passage configured to introduce a lubricating oil to the supercharger;
   a hydraulic biasing force generating device configured to suppress slack of the power transmission member;
   a branch path branched off the supercharger lubricating oil passage; and
   a supercharger holder configured to support a supercharger rotation shaft and detachably mounted on a combustion engine case, wherein:
   the biasing force generating device includes a pressing member configured to pivot around a pivot shaft to apply a pressing force to the power transmission member;
   a part of the lubricating oil introduced to the supercharger lubricating oil passage is supplied as a hydraulic source to the biasing force generating device through the branch path;
   the biasing force generating device is provided in the supercharger holder; and
   the power transmission member is driven such that the biasing force generating device is provided on a driven side of the power transmission member.

* * * * *